United States Patent Office 3,464,209
Patented Sept. 2, 1969

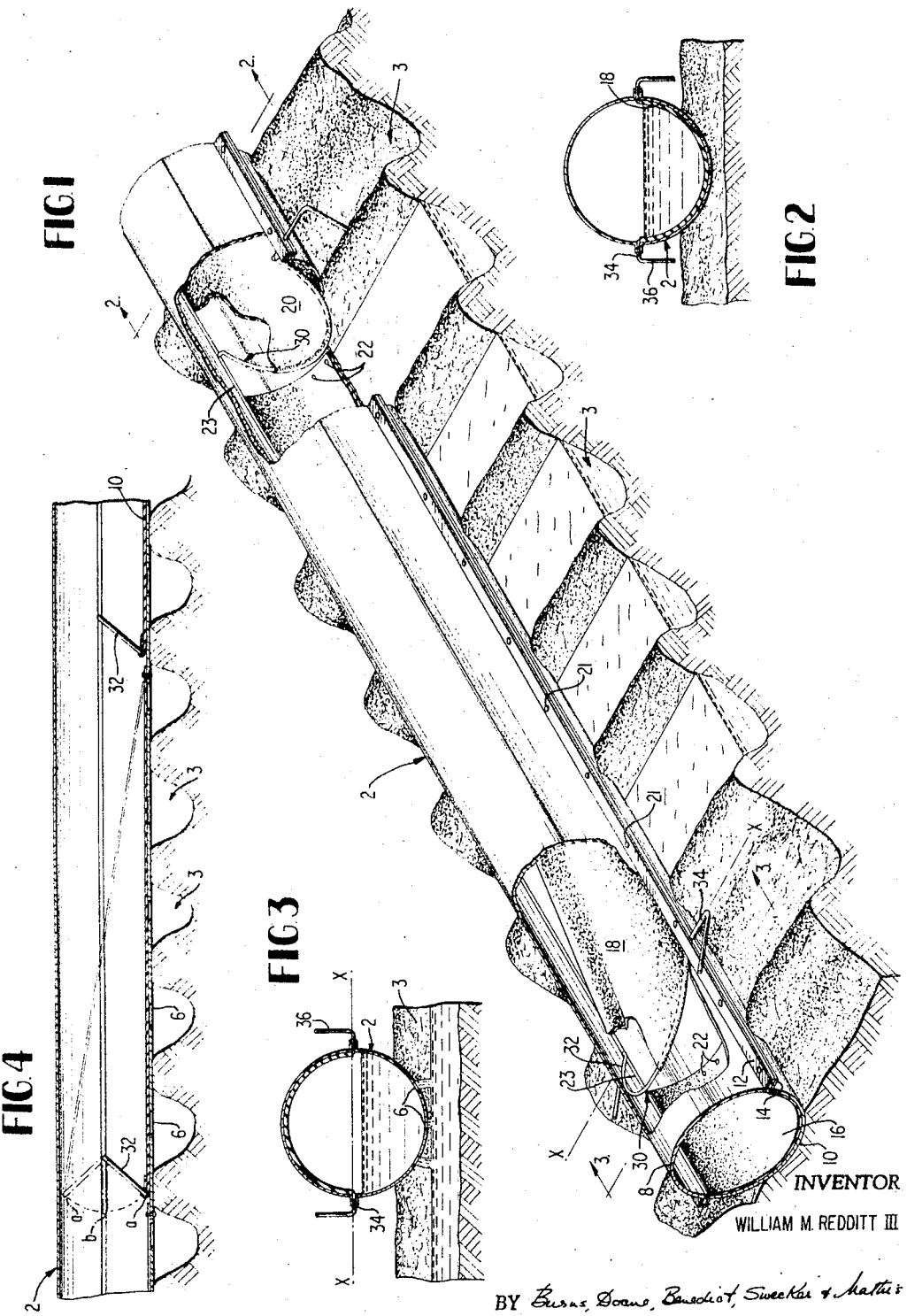

3,464,209
FLOW CONTROLLING IRRIGATION APPARATUS
William M. Redditt III, Honolulu, Hawaii, assignor to Hawaiian Sugar Planters' Association, Honolulu, Hawaii, a voluntary non-profit agricultural organization
Filed Feb. 6, 1968, Ser. No. 703,424
Int. Cl. E02b *13/00;* F16j *55/00*
U.S. Cl. 61—12                                 10 Claims

ABSTRACT OF THE DISCLOSURE

A flow controlling irrigation apparatus of the type including a water carrying conduit provided with a plurality of ports spaced therealong with a plurality of flexible diaphragms positioned in the condition to control the distribution of water from the ports in group of several ports at a time. At least one flexing means is provided for moving at least one of the diaphragm from a closed position overlying and closing the adjacent ports to an open position spaced away from the ports. The flexing means includes diaphragm contacting means secured to an upstream edge of the one diaphragm for holding the diaphragm in sealing relation against the lower interior portions of the conduit. Moving means connected to the diaphragm contacting means and movably mounted in the conduit, is adapted for application of force to the moving means to move at least a portion of the diaphragm contacting means away from the conduit to flex open the associated diaphragm. In one preferred embodiment the flexing means is provided with an over-center, spring action to assist in maintaining the diaphragm in each of its extreme open and closed positions.

BACKGROUND OF INVENTION

This invention relates to a flow controlling irrigation apparatus used to distribute water for irrigation purposes to agricultural land and the like.

In the pending application of Warren T. Gibson for a "Surface Irrigation Device," Ser. No. 681,769, filed Nov. 9, 1967, there is disclosed an irrigation apparatus intended to lower the capital costs of irrigation and to provide increased labor productivity. The apparatus described in that application includes a conduit provided with a plurality of longitudinally spaced ports through which water may be directed to underlying parallel furrows in the land to be irrigated, in groups of several furrows at a time, by the opening and closing of longitudinally extending flexible diaphragms secured to the conduit in an overlying relation to the ports. The present invention relates to an actuating device particularly adapted to flex the diaphragms between their open and closed positions and is suitable for either manual or automatic operation.

It is desirable in providing such actuating equipment that the apparatus should be as simple as possible in view of the large number of units required for irrigating substantial areas of land. In addition, reduction of the number of moving and working parts should be sought in order to reduce the need for field maintenance to a minimum.

SUMMARY OF THE INVENTION

It is therefore a general object of the invention to provide a flow controlling irrigation apparatus of the flexible diaphragm type described, wherein movement of the diaphragms between their open and closed positions may be particularly easily controlled.

It is a further object of the invention to provide a flow controlling irrigation apparatus of the type described having a minimum number of moving parts to provide low capital cost and reduced maintenance requirements.

It is another object of the invention to provide a flow controlling irrigation apparatus of the flexible diaphragm type described, which is particularly suitable for automatically controlled operation to minimize labor requirements and to facilitate round-the-clock irrigation.

In its broadest aspects the invention comprises a flow controlling apparatus including a conduit adapted to convey water provided with a plurality of ports spaced long the conduit. A plurality of thin flexible diaphragms are provided within the conduit, each including upstream and downstream edges extending generally transversely to the conduit positioned upstream and downstream respectively of at least one of the ports. Each diaphragm overlies the adjacent interior portions of the conduit in an extreme closed position of the diaphragm in conforming relation to the interior of the conduit to close at least one port. Connecting means are provided for connecting portions of each diaphragm to the conduit but permitting at least the upstream portion of the diaphragm to be selectively flexed away from the adjacent interior portions of the conduit to an extreme open position to permit water to flow between the upstream portion of the diaphragm and the conduit outwardly of the port. At least one flexing means for moving the upstream portion of at least one of the diaphragms between the open and closed positions is provided. The flexing means includes diaphragm contacting means fixedly connected with the upstream edge of the associated diaphragm for holding the edge in conforming, sealing relation against the adjacent interior portions of the conduit in the closed position of the diaphragm. Moving means connected to the diaphragm contacting means, is mounted in the conduit for motion relative thereto. The moving means is adapted for the application of force to move at least a portion of the diaphragm contacting means away from the adjacent interior of the conduit to flex open the diaphragm.

In one embodiment of the invention the flexing means is provided with an over-center spring action to resiliently maintain the associated diaphragm in a selected one of the extreme positions, but assisting movement of the diaphragm to the other of the extreme positions upon deflection of the disphragm beyond a predetermined distance away from the selected position.

THE DRAWINGS

One preferred embodiment of the invention is illustrated in the accompanying drawings in which:

FIGURE 1 is a partially broken away, perspective view of a flow controlled irrigation apparatus according to one preferred embodiment of the present invention;

FIGURE 2 is a transverse cross sectional view of a portion of the apparatus shown in FIGURE 1 taken along the line 2—2 thereof illustrating a diaphragm in closed position;

FIGURE 3 is a transverse cross sectional view of a the apparatus shown in FIGURE 1 taken along the line 3—3 thereof illustrating a diaphragm in open position;

FIGURE 4 is a longitudinal cross sectional view of the apparatus shown in FIGURE 1, illustrating in dotted lines the open position of one diaphragm thereof.

DETAILED DESCRIPTION

Referring to FIGURE 1 of the drawings, a preferred embodiment of the invention there shown includes a tubular longitudinally extending conduit 2 extending generally at right angles across a plurality of parallel irrigation furrows 3 dug in the ground. The conduit 2 is partially buried in the surface of the ground with the underside of the conduit spaced above the bottom of the furrows 3.

The conduit 2 includes a plurality of longitudinally spaced downwardly facing sets of ports 6 with a set of ports being aligned with each furrow 3. Water may be selectively directed to flow through the sets of ports 6 into the underlying furrows 3 in groups of several furrows at a time for distribution therealong.

The conduit 2 is formed by two opposed longitudinally extending, semi-circular, upper and lower half-tubes 8 and 10 provided along their longitudinal edges with opposed radially extending, outwardly directed, upper and lower flanges 12 and 14, respectively. A plurality of identical, longitudinally disposed, flexible diaphragms 16, 18 and 20 are positioned within the conduit 2. The lateral edges of the diaphragms 16–20 are sandwiched between the adjacent flanges 12 and 14 of the upper and lower tube portions 8 and 10 and the diaphragms are fixedly held along opposite sides of the conduit 2 by a plurality of elongate connectors 21, such as rivets, passing through the flanges and the diaphragms. Suitable adhesive sealing and bonding material may also be used to secure the transverse edges of the diaphragms to the flanges 12 and 14.

Other embodiments may include conduit 2 shapes other than semicircular, such as rectangular or elliptical, without influence on the principle or uniqueness of operation of the apparatus. Also, the lateral edges of the diaphragms 16–20 may be fixedly secured to the opposite edges of the conduit 2 by alternate means than being sandwiched between flanges of the conduit.

The downstream end of each of the diaphragms 16–20 is fixedly secured by rivets, adhesive or the like as indicated at 22 to the lower interior portion of the conduit 2 in conforming, sealing relation thereto adjacent and spaced a short distance from the upstream end of the next succeeding downstream diaphragm. Suitable conventional sealing material 23 is interposed between the flanges 14 and 16 in the area between adjacent diaphragms, to prevent the escape of water. Each diaphragm in a closed position thereof (FIGURE 2) lies conformingly against the adjacent interior of the conduit to function as a water-conveying lining so that irrigation water may be carried along the conduit and prevented from passing out through the various ports 6 underlying the closed diaphragm. However, the upstream end of each of the diaphragms may be flexed to an open position (FIGURE 3) so that water passes under the diaphragm and is directed outwardly through the underlying ports 6 into the various furrows 3 beneath. Furthermore, the closed downstream end of the diaphragm prevents water from passing downstream of the open diaphragm.

The structure thus far described is disclosed in greater detail in the previously mentioned application of Warren T. Gibson for a "Surface Irrigation Device," Ser. No. 681,769, filed Nov. 9, 1967, and such common disclosure is considered to be included herein by reference.

However, of particular interest in the present invention is the provision of a plurality of flexing units 30 each of which is connected to the upstream end of one of the various diaphragms 16–20. Each flexing unit 30 comprises a rigid wire-like member having a curved central portion or bail 32. The central portion 32 has its extremities spaced transversely apart and extends upstream therefrom in a generally semi-elliptical curve distributed symmetrically about the longitudinal axis of the conduit 2. The opposed extremities of the central portion 32 lie generally in the same plane as the transverse edges of the various diaphragms and are disposed on opposite sides of the conduit 2 closely adjacent to the sidewalls thereof.

The extremities of the central portion 32 are formed integrally with two transversely spaced oppositely, outwardly directed transverse axle portions 34. The axle portions 34 are cylindrical and pass abuttingly between the flanges 12 and 14 outwardly of the conduit 2 on opposite sides of it. The axle portions 34 have aligned cylindrical axes defining a horizontal rotational axis x—x extending generally perpendicular to the longitudinal axis of the conduit 2 on a diameter thereof. The axle portions 34 pass through holes between the adjacent parts of the diaphragms and the sealing material 23 and are located thereby against longitudinal motion relative to the conduit 2. Additionally, the adjacent diaphragm portions sandwiched between the flanges provide a watertight seal about the axle portions 34 without preventing rotational motion of the axle portions 34 about their cylindrical axes.

At its outward extremity each of the axle portions 34 is provided with an integral lever portion 36 disposed generally at right angles to the axle portion 34, in the plane of the central portion 32, and preferably extending generally upstream. The lever portion 36 provides a handle which may be grasped by an operator to rotate the flexing unit 30. Alternatively an automatic actuator, not shown, may be connected to the lever arm 36 and to the adjacent portions of the conduit 2 to rotate the flexing unit 30. The automatic actuator may take the form of a conventional motor of hydraulic, electrical, pneumatic or other type. Additionally, the automatic actuator may be controlled by timing apparatus such as a clock-work motor to provide selective rotational motions of the flexing unit 30 in one direction and the other, at times predetermined.

So that motion of each flexing unit 30 may be transferred to its associated one of the diaphragms 16–20, each diaphragm at its free upstream edge is configured to extend conformingly about the adjacent central portion 32 of the flexing unit 30 and is fixedly secured thereto in any suitable conventional manner such as bonding, stitching, riveting, or the like. In the closed position of each diaphragm, the control portion 32 of the unit 30 lies conformingly against the adjacent interior of the lower portion of the conduit 2 at a downward, upstream inclination thereto, and is biased downwardly in sealing contact against the conduit (in a manner to be described) to hold the associated diaphragm flush against the conduit so that water is conveyed over and along the diaphragm.

Actuation by means of the levers 36 causes corresponding rotation of the axle 34 to move the central portion 32 of a given unit 30 upwardly to an extreme open position in which it lies against the upper portion of the conduit 2 to hold the upstream end of the associated diaphragm open so that water may pass therebeneath out through the adjacent ports 6 into the underlying irrigation furrows.

In a particular feature of the invention, each flexing unit 30 is provided with an over-center spring action. The manner in which this is provided may be seen from FIGURE 4. It will be seen that the central portion 32 describes a vertical arc $a$—$a$ of less than 180 degress centered on the rotational axis $x$—$x$ as the diaphragm moves between the open and closed positions. At any intermediate point on the arc $a$—$a$ the diaphragm is stretched a greater distance axially upstream than it is when the central portion 32 occupies the extreme upper and lower points of the arc. The stretch is a maximum at about the center of the arc $a$—$a$ in a position $b$ generally coincident with the center line of the conduit. However, as the diaphragm as previously mentioned is resilient, this stretching causes a downstream force to be exerted on the central portion 32 applying a torque thereto tending to rotate the flexing unit 30 about the rotational axis $x$—$x$. Whenever the arm is positioned between the point $b$ and one of the upper and lower extremities of the arc $a$—$a$, the torque exerted by the stretching of a resilient diaphragm will act in a direction to resiliency bias the central portions towards the nearest of the upper or lower surfaces of the conduit 2. As the arm passes through the point $b$, the direction in which the torque acts changes. At each of the extremes of movement, the diaphragm is arranged to still possess a residual stretch and in addition the bail at each extreme is inclined to the vertical so that a residual resilient force biasing the diaphragm into sealing contact against the adjacent portions of the conduit in each of the extreme closed and open positions is provided.

In operation the various flexing units 30 in any one conduit are operated in predetermined sequence so that at any one time, one of the diaphragms may be in the open position directly all the flow through the ports beneath the open diaphragm with the diaphragms upstream of the open diaphragm in their closed position to convey water along the conduit to the open diaphragm. By using suitable remote control actuation and timing apparatus it is possible to operate a series of conduits on a round-the-clock basis to control flow of water to groups of several furrows at a time over a large area to be irrigated in such a manner as to make the most efficient use of the water available for irrigation. Automatic operation of the equipment in this manner enabling greater utilization of the conduits over a twenty-four hour period, permits smaller conduits of lower capital cost to be used and in addition greatly reduces the amount of labor required to control irrigation of a given area of land.

I claim:
1. A flow control irrigation apparatus comprising,
   a conduit adapted to convey water,
   a plurality of ports spaced along said conduit,
   a plurality of thin flexible diaphragms within said conduit, each of said diaphragms including,
      upstream and downstream edges extending generally transversely of said conduit positioned upstream and downstream respectively of at least one of said ports, each diaphragm in a closed position thereof overlying adjacent interior portions of said conduit in conforming relation to the interior thereof to close at least one port,
      connecting means for connecting portions of each diaphragm to said conduit, said connecting means permitting at least the upstream portion of each diaphragm to be selectively flexed away from said adjacent interior portions of said conduit to an open position of said diaphragm to permit water to flow between said upstream portion of said diaphragm and said conduit outwardly of said port; and
   at least one flexing means connected with at least one diphragm, including,
      diaphragm-contacting means connected with said upstream edge of said one diaphragm for holding said edge in conforming sealing relation against the adjacent interior portions of said conduit in the closed position of said diaphragm; and
      moving means connected to diaphragm-contacting means, said moving means mounted in said conduit for motion relative thereto, said moving means being adapted for the application of force to said moving means to move at least a portion of said diaphragm-contacting means away from said adjacent interior portion of said conduit to flex open said diaphragm.

2. A flow control apparatus as defined in claim 1 wherein
   said diaphragm is resilient,
   said diaphragm contacting means including,
      a substantially rigid wire like bail configured to lie generally conformingly against the lower interior portion of said conduit when said diaphragm is closed and having its extremities disposed in a plane generally coplanar with the transverse edges of said one diaphragm, said bail secured to said forward edge of said one diaphragm,
   said moving means further including,
      two opposed axle portions fixedly connected with said bail, said axle portions rotatably mounted in said conduit extending transversely outwardly on opposite sides thereof; and
      means connected with at least one of said axle portions adapted for the application of external torque to said bail to flex said diaphragm.

3. An irrigation apparatus comprising
   a conduit adapted to convey water,
   a plurality of ports spaced along said conduit,
   a plurality of flexible diaphragms within said conduit, each of said diaphragms including,
      upstream and downstream edges extending generally transversely of said conduit positioned upstream and downstream respectively of at least one of said ports, each diaphragm in an extreme closed position thereof overlying adjacent interior portions of said conduit in conforming relation to the interior thereof to close at least one port,
      connecting means for connecting portions of each diaphragm to said conduit, said connecting means permitting at least the upstream portion of each diaphragm to be selectively flexed away from said adjacent interior portions of said conduit to an extreme open position to permit water to flow between said upstream portion of said diaphragm and said conduit outwardly of said port; and
   at least one flexing means connected with said conduit and with said upstream edge of at least one of said diaphragms for selectively moving said one diaphragm between said open and closed positions, said flexing means having an over-center spring action to resiliently maintain said one diaphragm in a selected one of said extreme positions but assisting movement of said diaphragm to the other of said extreme positions upon deflection of said diaphragm beyond a predetermined distance away from said selected position.

4. An irrigation apparatus as defined in claim 3 wherein
   said diaphragm is resilient,
   said connecting means further preventing translational motion of said diaphragm axially along said conduit,
   said flexing means further including a rigid wire like member having,
      at least one axle portion mounted in said conduit for rotation about a horizontal rotational axis generally perpendicular to a longitudinal axis of said conduit,
      a bail portion connected to said axle portion, said bail portion secured to said upstream edge of said diaphragm extending upstream therefrom, said bail portion during movement of said diaphragm between said extreme positions thereof being rotated in an arc about said rotational axis, said bail portion at any point intermediate the ends of said arc extending a greater distance upstream than at said ends of said arc,
   whereby motion of said bail portion from either of said extreme positions causes stretching of said resilient diaphragm to provide an over-center spring action.

5. An irrigation apparatus as defined in claim 4 wherein,
   said conduit comprises a tube,
   said rotational axis of said bail portion being aligned with a horizontal diameter of said tube,
   said portion of said bail forming said forward edge of said diaphragm conformingly and sealingly engaging against the adjacent lower interior portions of said tube when said diaphragm is in the closed position thereof.

6. An irrigation apparatus as defined in claim 5 wherein
said bail portion is of generally semi-elliptical shape, with said bail portion lying conformingly closely adjacent the adjacent interior portions of said conduit upon movement of said diaphragm to said closed position.

7. An irrigation apparatus as defined in claim 4 wherein
said arc is less than one hundred and eighty degrees.

8. An irrigation apparatus as defined in claim 6 further including,
operating means secured to said axle portions positioned outside said conduit, said operating means adapted for the exertion of torque to cause said bail to be rotated to move said diaphragm between said open and closed positions.

9. In a flow-controlling irrigation apparatus of the type including a conduit having a plurality of ports spaced therealong and further having a plurality of thin, flexible diaphragms within the conduit, each of the diaphragms including upstream and downstream edges extending generally transversely of the conduit positioned upstream and downstream respectively of at least one of the ports and in an extreme closed position overlying adjacent interior portions of the conduit in conforming relation to the interior thereof to close at least one port, the apparatus further being of the type including connecting means for connecting portions of each diaphragm to the conduit, but determining at least the upstream portion of each diaphragm to be selectively flexed away from adjacent interior portions of the conduit to an extreme open position to permit water to flow between the upstream portion of the diaphragm and the conduit outwardly of the port; the improvement comprising,
flexing means connected with the upstream edge of at least one of the diaphragms for selectively moving the diaphragm between the open and closed positions thereof, said flexing means having an over-center spring action to resiliently maintain the upstream position of the associated diaphragm in a selected one of the extreme positions but assisting the diaphragm to move to the other of the extreme positions thereof upon deflection of the diaphragm beyond a predetermined distance away from the selected position.

10. A flow control apparatus comprising,
a conduit having a fluid passage,
a plurality of ports extending through said conduit communicating with and spaced along said passage,
at least one thin, flexible diaphragm within said housing, said diaphragm including,
upstream and downstream edges extending generally transversely of said passage positioned upstream and downstream respectively of at least one of said ports, said diaphragm overlying adjacent interior portions of said conduit in an extreme closed position in conforming relation to the interior thereof to close at least one port,
connecting means for connecting portions of said diaphragm to said conduit, said connecting means permitting at least the upstream portion of said diaphragm to be selectively flexed away from said adjacent interior portions of said conduit to an extreme open position to permit fluid to flow between said diaphragm and said housing outwardly of said port, and
flexing means connected with said upstream edge of said diaphragm for selectively moving said diaphragm between said open and closed positions, said flexing means having an over-center spring action to resiliently maintain said diaphragm in a selected one of said extreme positions upon small deflections from said selected position but assisting said diaphragm to move to the other extreme position upon deflection of said diaphragm beyond a predetermined distance away from said selected position.

References Cited

UNITED STATES PATENTS

| | | | |
|---|---|---|---|
| 547,501 | 10/1895 | Richter | 61—13 |
| 2,148,419 | 2/1939 | Parker | 61—12 X |
| 2,527,047 | 10/1950 | Wold | 61—12 |
| 2,656,682 | 10/1953 | Wold | 61—12 |

FOREIGN PATENTS 23,798    3/1936    Australia.

EARL J. WITMER, Primary Examiner